March 13, 1962    R. A. WEST    3,025,441
ELECTRICAL CAPACITOR
Filed Sept. 19, 1958

Inventor,
Robert A. West,
by Gilbert P. Tarleton
His Attorney.

3,025,441
ELECTRICAL CAPACITOR
Robert A. West, Fort Ann, N.Y., assignor to General Electric Company, a corporation of New York
Filed Sept. 19, 1958, Ser. No. 762,053
8 Claims. (Cl. 317—258)

The present invention relates to electrical capacitors, and more particularly to an improved oxide capacitor adapted for high temperature operation.

Prior known dielectric capacitors including those employing mica, metal oxide, and various refractory insulating materials as dielectrics have not generally been suitable for operation at temperatures of 400° C. and upwards, conditions under which it has been increasingly necessary to use capacitors in certain applications. A principal drawback of prior capacitors is that their insulation resistance is too low at elevated temperatures to provide satisfactory operation of the electronic equipment in which they are used, and create excessive demands on the power supplies used. Insulation resistance has become widely used in the industry as a criterion of the quality of electrical capacitors, since it is known that low insulation resistance in general is a result of impurities in the dielectric. Capacitors in general suffer a marked drop in insulation resistance with increasing temperature, so that at temperatures over 400° C. the insulation resistance of known types of capacitors is at an unacceptably low level.

It is an object of the invention to provide an improved capacitor for high temperature operation which avoids the above-mentioned drawback of prior types of capacitors.

It is another object of the invention to provide an improved electrode material for capacitors, especially of the oxide type, which confers superior electrical and physical properties on the capacitor under higher temperature operational conditions.

In its broad aspect, the invention relates to an electrical capacitor comprising an electrode composed of an alloy of a metal and a metal oxide, a dielectric coating overlying the alloy electrode composed of an oxide of the base metal, and a counter electrode superimposed on the dielectric oxide coating. In a preferred embodiment, the alloy electrode is composed of aluminum and aluminum oxide of the composition hereinafter more fully described, and the dielectric oxide coating is constituted by layers of anodically formed aluminum oxide.

The invention will be better understood from the following description taken in conjunction with the accompanying drawing, in which.

Figure 1:
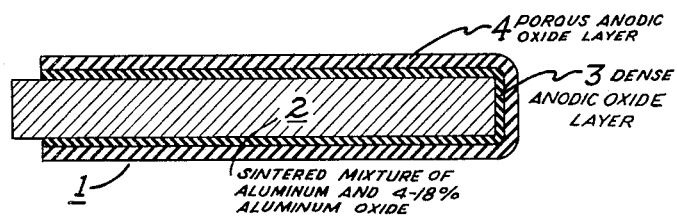
FIG. 1 is a cross-sectional view in exaggerated scale of a filmed capacitor electrode of the present invention.

Referring now to the drawing, and particularly to FIG. 1, there is shown a filmed electrode member 1 comprising an electrode plate 2 having formed thereon anodic oxide dielectric films 3 and 4. Electrode plate 2 is composed in accordance with the invention of a novel electrode material which makes it possible to successfully employ the capacitor at very high temperatures. This material is of the type known as a cermet, a combination ceramic-metallic material, and consists, in a preferred embodiment, of a compacted powder metallurgy foil or sheet of aluminum and aluminum oxide formed by the techniques of powder metallurgy hereinafter described.

Cermets are compositions made by bonding grains of ceramic or refractory materials with metal, and are usually made by powder metallurgy techniques in which a powdered mixture of refractory and metal particles is molded to the desired form and subjected to high temperature and pressure.

The cermet material of which the electrode is composed in accordance with the invention is preferably made from fine aluminum powder of very high purity, for example, 99.9% aluminum. The aluminum powder particles are provided with a film of aluminum oxide by any suitable oxidizing process such as by exposure to air, with or without heating. In a particular powder metallurgy material of this type, the initial aluminum flake powder may be so fine that at least 50% of the flakes have a dimension of two microns or less. The oxide-filmed aluminum particles are compacted at high temperature into a coherent mass and extruded to form dense sheets or foils. During this process the applied pressure apparently deforms the aluminum powder, thus breaking the oxide film surrounding the aluminum particles, and welding the particles together due to the flow of the aluminum. This procedure results in dense, nonporous compacted homogeneous material having a dispersion of fine particles of aluminum oxide in the aluminum mass. Material of the above-described type wherein the aluminum oxide is in the range of about 4–18% by weight of the mass is particularly suitable for the purposes of the present invention.

Aluminum-aluminum oxide material of the above type is commercially available and is known in one form as sintered aluminum powder, (usually abbreviated SAP). Another similar material in foil form is also commercially available.

These aluminum powder metallurgy materials have exhibited remarkable strength, stability and resistance to creep at elevated temperature, and it appears that their excellent high temperature properties are due chiefly to the dispersion of the aluminum oxide inclusions. While difficulty has been encountered in determining the actual sizes of the oxide particles, a theoretical determination has placed the thickness of the oxide films at about 50–100 Angstrom units.

In a preferred form of the present invention as shown in the embodiment illustrated in the drawing, the described aluminum-aluminum oxide electrode sheet 2 is anodically treated to provide on its surface a dense anodic aluminum oxide layer 3 and a porous anodic aluminum oxide layer 4. The thicknesses of the layers of the device illustrated are shown in exaggerated scale for the purposes of clarity, and the relative dimensions of the parts as shown are not necessarily those used in practice. Normally, the dense oxide layer 3 is considerably thinner than the porous oxide layer 4.

The dense oxide layer 3 serves as the principal dielectric barrier layer for the capacitor while the outer porous oxide layer 4, which is more readily formed to a greater thickness than the inner layer 3, serves to protect the latter from abrasion and other physical injury. Layers 3 and 4 are formed differently to provide for their different characteristics. Oxide layer 4 is formed by anodizing electrode 2 in a solution of film-forming electrolyte in which the anodic aluminum oxide film is somewhat soluble. Such electrolytes are, for example, oxalic acid, and dilute sulphuric acid. Although the reaction between such film-forming electrolytes and the aluminum oxide film formed thereby is not completely known, it appears that the oxide layer is porous as it is being formed, due presumably to its partial solution in the electrolyte. Because of its porous nature, the film permits continued penetration of the electrolyte to the surface of the aluminum plate 2 for further reaction therewith so as to increase the thickness of the aluminum oxide film being formed.

On the other hand, the thin dense dielectric oxide layer 3 is formed in accordance with conventional capacitor electrode film-forming procedures whereby a very thin dense anodic oxide layer is produced on the surface of the electrode. The forming electrolytes used for this purpose may comprise, for example, boric acid, tartaric acid, succinic acid, glycol-borates, or such other known film-forming materials as have little or no solvent action on the aluminum material of the electrode plate. The film formed by such electrolytes is a non-porous, dense barrier-type layer, and after being formed into a certain thickness, the film resists further oxide formation (anodization) necessitating constantly increasing voltages to produce further anodic reaction.

In the sequence of forming the oxide layers, layer 4 is formed first and then layer 3 is formed. The forming electrolyte for layer 3 penetrates the porous layer 4 and builds up layer 3 under layer 4 as shown in the illustrated structures. If the dense layer 3 is formed first, the porous layer 4 cannot be effectively formed thereafter on the electrode.

Figure 2:
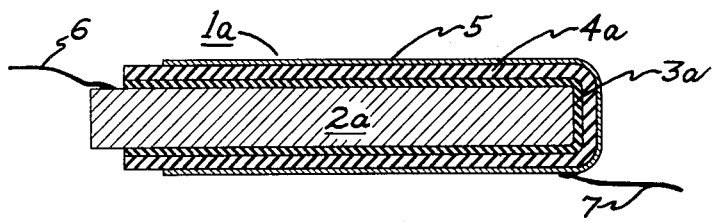
FIG. 2 shows a modified form of filmed capacitor electrode of the present invention.

FIG. 2 shows a filmed electrode of the above-described type on which a counter electrode is provided in the form of a metal coating 5 deposited by a vapor condensation metallizing or other suitable procedure over oxide coating 4a. The edges of coating 5 are offset from the edges of the anodic oxide coatings 3a and 4a to avoid short circuiting of the electrodes. Leads 6 and 7 are attached by any suitable means to the electrodes 2a and 5, respectively.

As will be understood, a number of units of the structure shown in FIG. 2 may be arranged in stacked assembly if desired, with the units in parallel or in series, to construct a multi-unit capacitor.

Figure 3:
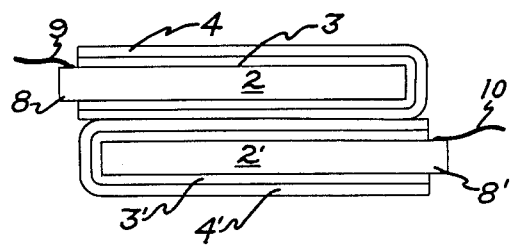
FIG. 3 shows an assembly of capacitor electrodes of the FIG. 1 type to form an operative capacitor.

FIG. 3 shows an assembly which is adapted for higher voltage applications than the FIG. 2 arrangement. In this assembly, the units of the FIG. 1 structure are superimposed on one another with the unfilmed electrode portions 8 and 8' of filmed electrodes 2 and 2' projecting in opposite directions. Leads 9 and 10 are suitably secured to portions 8 and 8' respectively. Here, also, any desired number of units may be stacked to obtain a capacitor of particular electrical rating and capacity.

A stacked capacitor assembly made of electrode plates of the construction shown in FIG. 1 was found capable of operation at 500° C., and at such elevated temperature its electrical characteristics were much superior to prior types of capacitors. These capacitors were made from three mil thick foil of the aluminum-aluminum oxide powder metallurgy material described above having 6–8% aluminum oxide content. The foil was first anodized in a 3% aqueous oxalic acid solution to form a 7.5 micron thick oxide layer, and then anodized in an electrolyte of 1.5% boric acid to an approximate thickness of 1 micron oxide film. A stacked capacitor assembly of 21 foils so anodized was made, encased in a stainless steel case, and subjected to 85 volts D.C. for 26 hours at 450° C. Electrical tests were made on the unit with the following results:

| Temp., ° C. | Capacitance (microfarads at 1,000 cycles) | Percent D (1,000 cycles) | Insulation Resistance (Megohm-microfarads) | |
|---|---|---|---|---|
| | | | Present Invention (Curve A) | Conventional Material (Curve B) |
| 200 | 0.011 | 0.10 | 1,320 | 470 |
| 300 | 0.011 | 0.15 | 1,400 | 48 |
| 400 | 0.011 | 0.39 | 600 | 4 |
| 450 | 0.012 | 0.72 | 154 | |
| 500 | 0.012 | 1.49 | 54 | |

The last column shows, by way of comparison, insulation resistance data obtained under the same conditions from a conventional capacitor corresponding to that represented by curve B on the FIG. 4 graph, as described hereinafter.

Percent D in the above table is a measure of the ratio of energy dissipated to energy stored. The lower this value, the higher is the quality of the capacitor.

It will be evident from the values shown in the table that the capacitor of the present invention has remarkably good electrical properties over a range of high temperatures, and that particularly in insulation resistance characteristics it far surpasses conventional capacitors.

Figure 4:
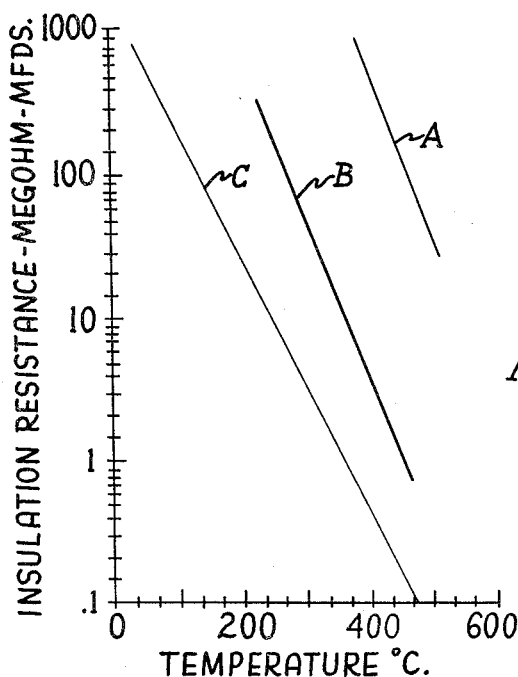
FIG. 4 graphically illustrates electrical characteristics of the capacitor device of the present invention as compared to those of prior art devices.

FIG. 4 is a graph showing a comparison of the above-described capacitor assembly with other types of capacitors, wherein insulation resistance in megohm microfarads is plotted on a logarithmic scale against temperature in degrees centigrade. Curve A represents the capacitor of the present invention, curve B an oxide type capacitor similar to the present device except that a conventional high purity aluminum foil was used instead of the described powder metallurgy material, and curve C represents a capacitor composed of a stacked unit having stainless steel electrodes separated by mica dielectric sheets. The curves all show the characteristic drop in insulation resistance with increasing temperature, but it is manifest from the graph that the present device is far superior in insulation resistance at high temperatures to either of the other types of capacitors. At 450° C., for example, the present capacitor exhibits an insulation resistance of about 154 megohm microfarads, compared to the approximately 1 megohm microfarad and 0.2 megohm microfarad of the other two capacitors, respectively.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising spaced electrodes having dielectric material interposed therebetween, at least one of said electrodes being composed of a homogeneous sintered powder metallurgy mixture of 4–18% by weight of aluminum oxide and the remainder aluminum, said dielectric material consisting of at least one anodic aluminum oxide layer on at least said one electrode.

2. An electrical capacitor comprising spaced electrodes having dielectric material interposed therebetween, at least one of said electrodes being composed of a homogeneous sintered powder metallurgy mixture of aluminum and 4–18% aluminum oxide, said dielectric material consisting of a plurality of different anodic aluminum oxide layers on at least said one electrode.

3. An electrical capacitor comprising spaced electrodes having dielectric material interposed therebetween, at least one of said electrodes being composed of an integral, non-porous, compacted homogeneous mass of a sintered mixture of powdered aluminum and aluminum oxide, the aluminum oxide constituting about 4–18% by weight of the mass, said dielectric material consisting of at least one anodic aluminum oxide layer on at least said one electrode.

4. An electrical capacitor having high insulation resistance and adapted for operation at temperatures over 400° C. comprising spaced electrodes having dielectric material interposed therebetween, at least one of said electrodes being composed of an integral, non-porous, compacted homogeneous mass of particles composed of a sintered mixture of aluminum and 6–8% by weight of aluminum oxide, said dielectric material consisting of at least one anodic aluminum oxide layer on at least said one electrode.

5. An electrode structure for electrical capacitors adapted for operation at temperatures above 400° C. comprising an integral, non-porous compacted homogeneous mass of particles formed into a sheet and composed of a sintered mixture of aluminum and 6–8% by weight of aluminum oxide, said sheet having an anodic aluminum oxide dielectric layer thereon.

6. An electrical capacitor comprising spaced electrodes having dielectric material interposed therebetween, at least one of said electrodes being composed of an integral, non-porous, compacted homogeneous mass of a sintered mixture of powdered aluminum and aluminum oxide, the aluminum oxide constituting about 4–18% by weight of the mass, said dielectric material consisting of a thin, dense anodic aluminum oxide layer superposed on a major portion of at least one of said electrodes and a thicker porous anodic aluminum oxide layer superposed on said thin, dense anodic aluminum oxide layer.

7. An electrode structure for electrical capacitors adapted for operation at temperatures above 400° C. comprising an integral, non-porous, compacted homogeneous mass of particles formed into a sheet and composed of a sintered mixture of aluminum and 4–18% by weight of aluminum oxide, said sheet having an anodic aluminum oxide dielectric layer thereon.

8. An electrode structure for electrical capacitors adapted for operation at temperatures above 400° C. comprising an integral, non-porous, compacted homogeneous mass of particles formed into a sheet and composed of a sintered mixture of aluminum and 4–18% by weight of aluminum oxide, said sheet having thereon a thin, dense anodic aluminum oxide dielectric layer and a thicker porous anodic aluminum oxide dielectric layer superposed on said thin, dense anodic dielectric layer.

References Cited in the file of this patent

UNITED STATES PATENTS

| | | |
|---|---|---|
| 2,299,228 | Gray et al. | Oct. 20, 1942 |
| 2,361,378 | Brennan | Oct. 31, 1944 |
| 2,729,880 | Miller | Jan. 10, 1956 |
| 2,930,951 | Burger et al. | Mar. 29, 1960 |

FOREIGN PATENTS

| | | |
|---|---|---|
| 396,453 | Great Britain | Aug. 10, 1933 |
| 625,364 | Great Britain | June 27, 1949 |